(12) United States Patent
Suh

(10) Patent No.: US 6,977,687 B1
(45) Date of Patent: Dec. 20, 2005

(54) APPARATUS AND METHOD FOR CONTROLLING A FOCUS POSITION FOR A DIGITAL STILL CAMERA

(75) Inventor: Inh-Seok Suh, Kyungki-do (KR)

(73) Assignee: Samsung Techwin Co., Ltd., Suwon (KR)

(*) Notice: Subject to any disclaimer, the term of this patent is extended or adjusted under 35 U.S.C. 154(b) by 0 days.

(21) Appl. No.: 09/167,539

(22) Filed: Oct. 7, 1998

(30) Foreign Application Priority Data

Oct. 7, 1997 (KR) .............................. 1997-51339

(51) Int. Cl.[7] ........................ H04N 5/232; H04N 5/222
(52) U.S. Cl. ............. 348/345; 348/333.03; 348/231.99
(58) Field of Search .......................... 348/350, 333.03, 348/333.01, 333.02, 345, 349, 351, 84, 88, 348/103, 231.99, 346, 94

(56) References Cited

U.S. PATENT DOCUMENTS

| | | | | |
|---|---|---|---|---|
| 5,432,871 A | * | 7/1995 | Novik | 382/232 |
| 5,491,510 A | * | 2/1996 | Gove | 348/77 |
| 5,625,415 A | * | 4/1997 | Ueno et al. | 348/350 |
| 5,640,619 A | | 6/1997 | Takayama et al. | 396/137 |
| 5,745,175 A | | 4/1998 | Anderson | 348/345 |
| 5,808,678 A | * | 9/1998 | Sakaegi | 348/350 |
| 5,838,818 A | * | 11/1998 | Herley | 382/166 |
| 5,845,010 A | * | 12/1998 | Silverbrook et al. | 382/232 |
| 5,850,250 A | * | 12/1998 | Konopka et al. | 348/15 |
| 5,915,046 A | * | 6/1999 | Echigo et al. | 382/248 |
| 6,115,482 A | * | 9/2000 | Sears et al. | 348/62 |
| 6,124,890 A | * | 9/2000 | Muramoto | 348/345 |
| 6,154,253 A | * | 11/2000 | Kiri et al. | 348/345 |
| 6,194,244 B1 | * | 2/2001 | Yamaguchi et al. | 438/57 |
| 6,262,713 B1 | * | 7/2001 | Brusky et al. | 348/734 |
| 6,278,489 B1 | * | 8/2001 | Hirasawa | 348/350 |
| 6,388,707 B1 | * | 5/2002 | Suda | |

FOREIGN PATENT DOCUMENTS

| | | | | |
|---|---|---|---|---|
| EP | 0 860 825 A2 | 2/1998 | | G02B 7/28 |
| FR | 2674036 | * 9/1992 | | G03B 13/36 |
| JP | 04-002281 A | 1/1992 | | |
| JP | 10-68992 A | 8/1996 | | G03B 17/18 |

* cited by examiner

Primary Examiner—David L. Ometz
Assistant Examiner—Lin Ye
(74) Attorney, Agent, or Firm—McGuireWoods LLP

(57) ABSTRACT

An apparatus for controlling a focus position for a digital still camera allows a user to take a picture with a certain focused position by moving a focus to a desirable position of the subject. The apparatus comprises a display unit for displaying an image corresponding to a mark representing the focus position, a switch unit and a touch screen for moving the mark on the display unit. The touch screen covers an active area of the display unit. The apparatus further comprises a focus controller for controlling to focus on a position of the subject corresponding the mark moved by the switch or the touch screen.

8 Claims, 4 Drawing Sheets

APPARATUS AND METHOD FOR CONTROLLING A FOCUS POSITION FOR A DIGITAL STILL CAMERA

BACKGROUND OF THE INVENTION

1. Field of the Invention

The present invention relates to an apparatus and a method for controlling a focus position for a digital still camera, and more particularly, to an apparatus and method for controlling a focus position for a digital still camera, which allows a user to move a focus to a desirable position on a subject.

2. Description of the Prior Arts

A conventional digital still camera is a device which uses an electronic sensor such as a charge coupled device (CCD), to capture an image; a digital camera processor (DCP) to convert analog image signals from the CCD into digital image signals; a storage device to store the digital image signals; and a liquid crystal display (LCD) to display the digital image signals.

Conventionally, an autofocus system of a digital camera utilizing image signals of DCP in focusing marks a focus position on an LCD. The mark is fixed at the center of the LCD and a user should locate a subject to be focused at the center of the LCD and take a photograph.

Therefore, even when the subject to be focused is not located at the center of the frame, the camera assumes that the center of the frame needs to be focused and has the real subject intended to be focused be out of focus.

SUMMARY OF THE INVENTION

It is an objective of the present invention to provide an apparatus and a method for controlling a focus position for a digital still camera. It is also an object of the present invention to provide an apparatus and a method for moving a focus position to a desirable position of a subject.

To achieve the objective and in accordance with the purpose of the invention, as embodied and broadly described herein, the invention comprises a display unit for displaying an image corresponding to a subject and a mark representing a focus position, a switch unit for moving the mark on the display unit according to a user's request. The invention further comprises a focus controller for controlling focus on the mark displayed on the display unit.

Also, to achieve this objective, the present invention comprises the steps of determining whether a user inputs a movement of the focus position, displaying the inputted focus position when the user inputs a movement of the focus position, focusing on the position of a subject corresponding to the displayed focus position.

BRIEF DESCRIPTION OF THE DRAWINGS

The accompanying drawings, which are incorporated in and constitute a part of this specification, illustrate one embodiment of the invention and, together with the description, serve to explain the principles of the invention. In the drawings.

DETAILED DESCRIPTION OF THE PREFERRED EMBODIMENTS

Reference will now be made in detail to the preferred embodiment of the present invention, an example of which is illustrated in the accompanying drawings.

Figure 1:
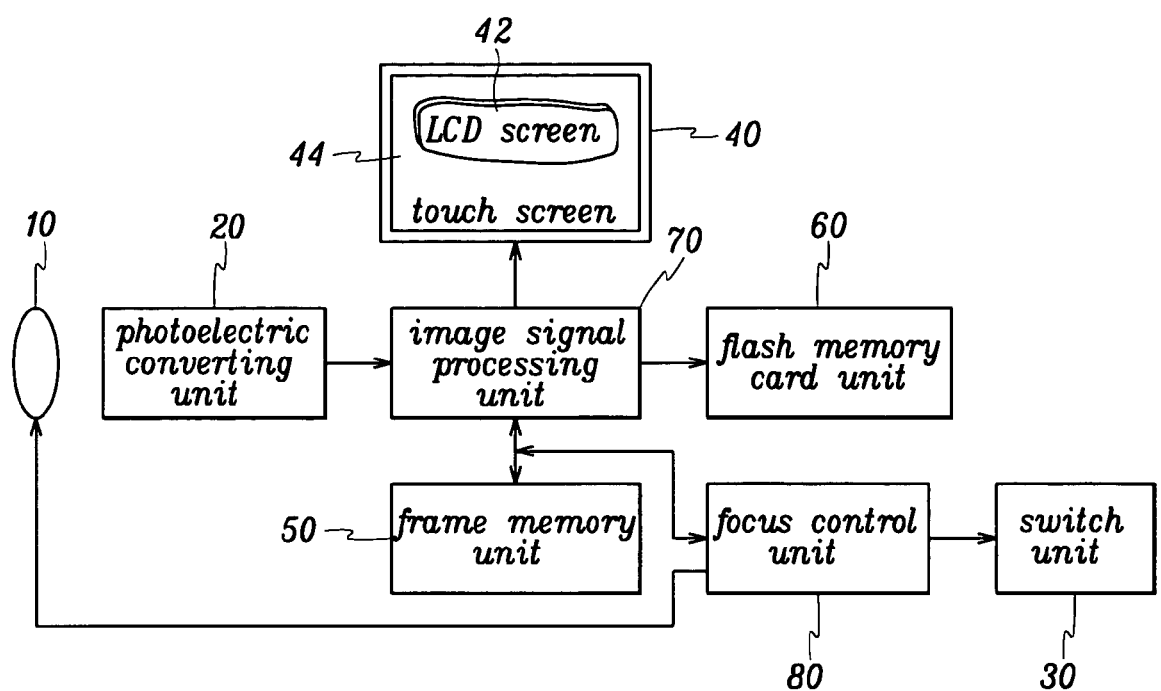
FIG. 1 is a block diagram of a digital still camera in accordance with a preferred embodiment of the present invention.
Figure 2:
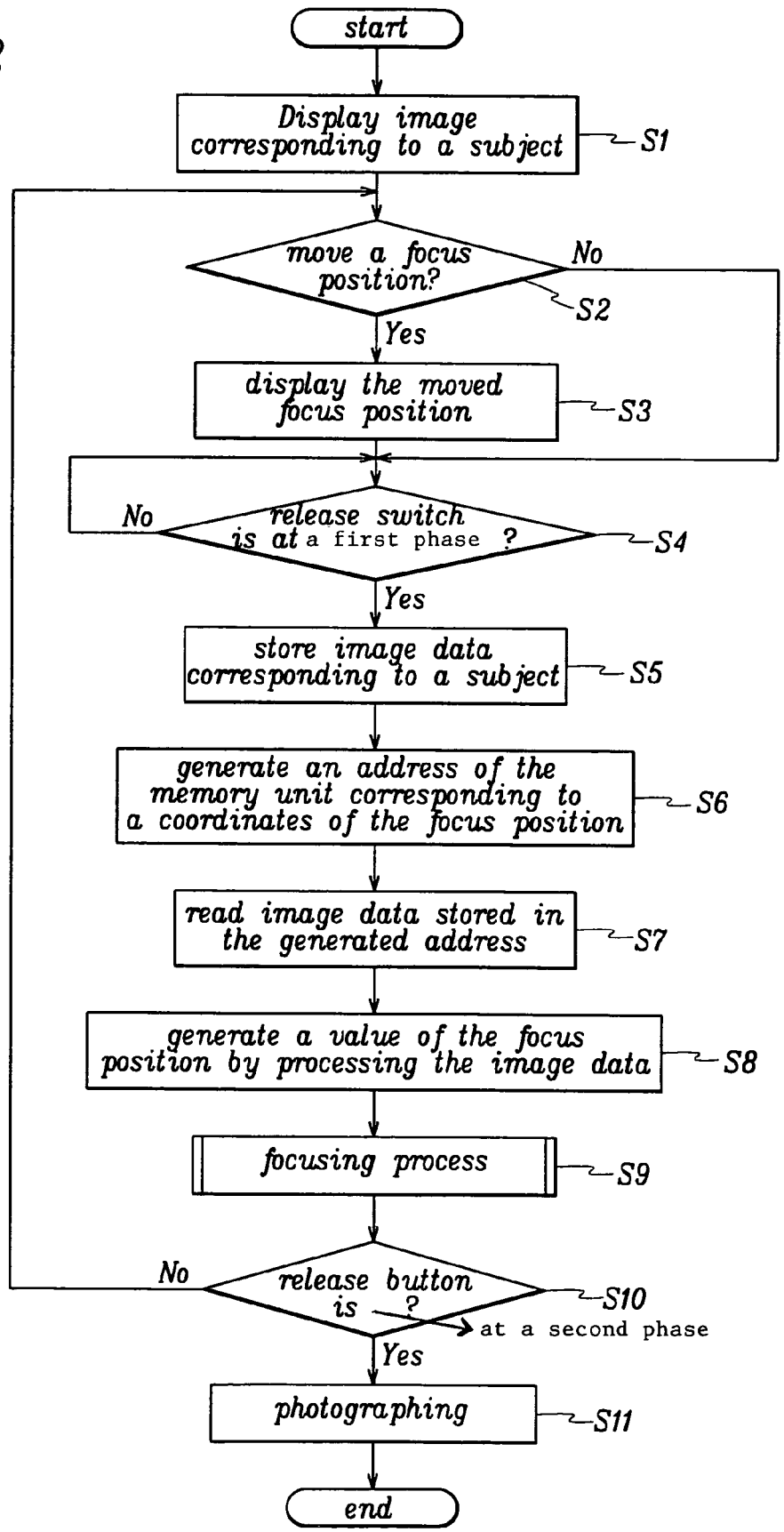
FIG. 2 is a flowchart showing the operation for controlling a focus position for a digital still camera in accordance with a preferred embodiment of the present invention.

As shown in FIG. 1, a digital still camera comprises a lens/lens driving unit 10 generating an image by collecting light from the subject, a photoelectric converting unit 20 for generating electric signals corresponding to the image generated by the lens/lens driving unit 10, a switch unit 30 established on the camera body for moving a focus position and for starting photographing according to a user's selection, an LCD unit 40 for displaying the image. The switch unit 30 comprises arrow keys or a joy stick. The LCD unit 40 comprises a LCD screen 42 for displaying the image and a touch screen 44 for moving the focus position according to the user's selection. The active area of the LCD screen 42 is covered by the touch screen 44. The apparatus further comprises a frame memory unit 50 for storing image data, and a flash memory card unit 60 for storing a compressed image data, an image signal processing unit 70 for generating image data by processing the electric signals generated from the photoelectric converting unit 20, for storing the image data in the frame memory unit 50, and for displaying the image data on the LCD screen 42. The apparatus additionally comprises a focus control unit 80 that moves a focus position according to the user's selection through the switch unit 30 or the touch screen 44 and displays the relocated focus position on the LCD unit 40 by controlling the image signal processing unit 70. The focus control unit 80 generates a value of the focus position by processing the image data stored in the frame memory unit 50 corresponding to the relocated focus position and focuses the new subject by controlling the lens/lens driving unit 10 according to the value of the focus position. The focus control unit 80 also compresses the image data stored in the frame memory unit 50 when the user selects to photograph via the switch unit 30, and stores the compressed image data in the flash memory card unit 60 by the image signal processing unit 70. Further, the focus control unit 80 restores the compressed image data in the flash memory card unit 60 and stores the frame memory unit 50 as needed. The digital still camera comprises a release switch (not shown) for taking a photograph. The release switch operates at two phases. The camera executes the operation of a focusing process at the first phase of the release switch. If further pressed, the camera executes the operation of storing an image of the subject at the second phase of the release switch.

Figure 3:
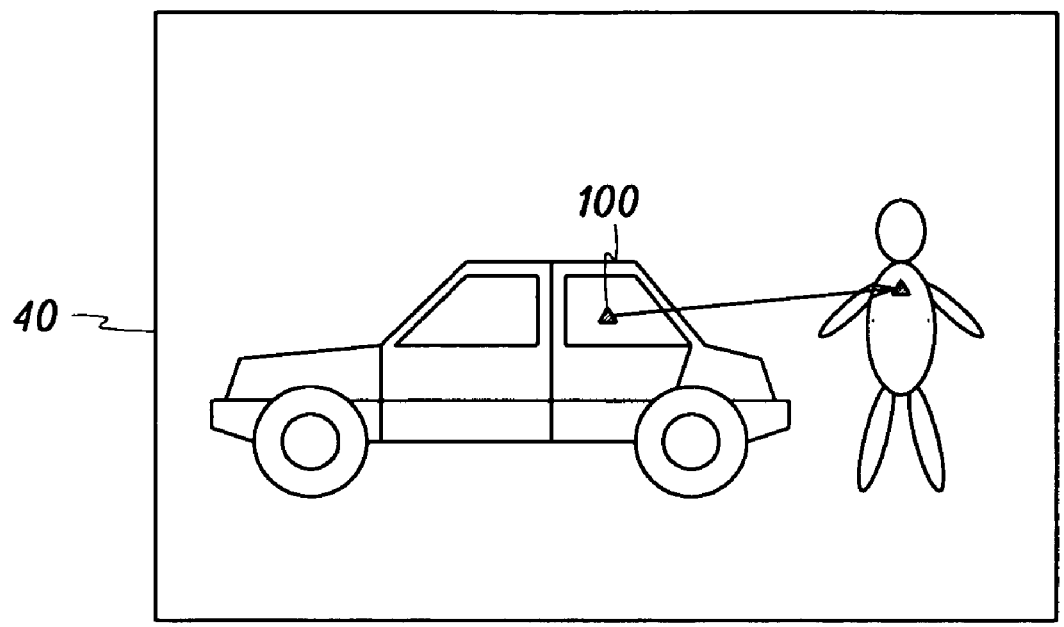
FIG. 3 is a diagram showing the movement of the mark displayed on the LCD.

As shown in FIG. 3, a mark 100 represents the focus position of the LCD unit 40. The mark 100 is located at the center of the LCD unit 40 early when the camera turns on. Then, an initial focus position is on the center of the image displayed on the LCD unit 40. If a user moves the mark 100 using the switch unit 30 or the touch screen 44, the user can move the focus position anywhere on the image displayed on the LCD unit 40.

Now, referring to FIGS. 1, 2, 3 and 4, the operation of the apparatus for controlling a focus position for a digital still camera in accordance with a preferred embodiment of the present invention will be explained.

At step S1, a user faces the lens/lens driving unit 10 of the digital still camera to a subject after the camera is turned on. Then, the lens/lens driving unit 10 forms an image of the subject. The photoelectric converting unit 20 generates electric signals corresponding to the image formed by the lens/lens driving unit 10 and transmits the signals to the image signal processing unit 70, which generates image data corresponding to the signals. Then, the image signal processing unit 70 stores the image data in the frame memory unit 50 and transmits the image data to the LCD unit 40 to displays the image.

Next, at step S2, the user views a picture in the LCD unit 40. The mark 100 is on a car located at the center of the LCD unit 40 and initially the car located at the center of the LCD unit 40 is focused. A user can move the focus position by using the switch unit 30 that has arrow keys or a joy stick or the touch screen 44 without changing the frame and composition of the picture. The user may relocate the mark 100 through the switch unit 30 or the touch screen 44 to a non-center position of the LCD unit 40, for example, to a person of FIG. 3. Accordingly, the final picture will be focused on the person.

If the user relocates the mark 100 through the switch unit 30 or the touch screen 44, the focus control unit 80 controls the image signal processing unit 70 in order to display the relocated mark 100 on the LCD unit 40, at step S3. Next, at step S4, the focus control unit 80 checks the state of release switch. If the release switch is at the first phase, then the operation goes to step S5, where the image signal processing unit 70 stores the image data of the subject in the frame memory unit 50 and transmits the image data to the LCD unit 40 to displays the image. Next, at step S6, the focus control unit 80 calculates an address of the frame memory unit 50 corresponding to coordinates of the mark 100 displayed on the LCD unit 40. Image data corresponding to the position of the mark 100 are stored in the calculated address of the frame memory unit 50. At step S7, the focus control unit 80 controls the image signal processing unit 70 to read the image data stored in the calculated address of the frame memory unit 50. Next, the image signal processing unit 70 processes the image data in order to focus the lens 10. Then, the focus control unit 80 generates a focus value using the processed image data, at step S8.

Figure 4:
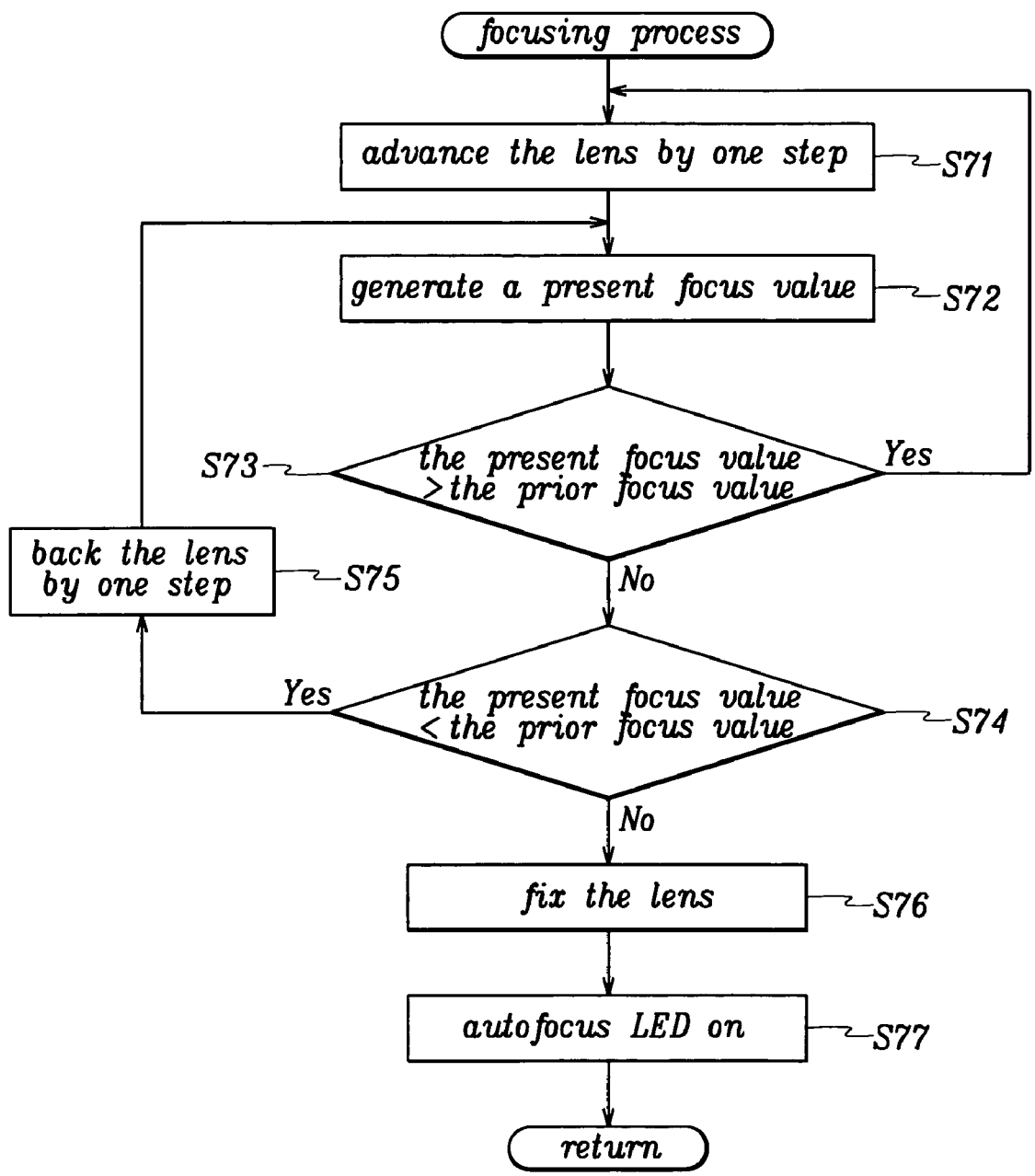
FIG. 4 is a flowchart showing the operation of the focusing process subroutine called in the main routine of FIG. 2.

At step S9, the focusing process subroutine is executed. Referring to FIG. 4, the operation of the focusing process subroutine at step S9 will be explained.

At step S71, the image signal processing unit has the focus control unit 80 advance the lens 10 by one focusing step. At step S72, the focus control unit 80 generates a present focus value. Next, at step S73, the focus control unit 80 determines whether the present focus value is larger than the prior focus value generated at step S8. If the present focus value is larger than the prior focus value, then steps S71 and S72 are repeated. However, if the present focus value is not larger than the prior focus value, then the operation proceeds to step S74.

At step S74, the focus control unit 80 determines whether the present focus value is smaller than the prior focus value. If the present focus value is smaller than the prior focus value, then the operation goes to step S75, where the focus control unit 80 backs the lens 10 by one focusing step. Next, step S72 and S73 are repeated. However, if the present focus value is not smaller than the prior focus value, that is, if a maximum focus value is found, then the operation proceeds to step S76.

At step S76, the focus control unit 80 fixes the lens 10. Next, the focus control unit 80 turns on an autofocus LED (light emitting diode) which signifys a completion of the focusing process.

Consequently, at step S9, the focus control unit 80 focuses on the person by controlling the lens/lens driving unit 10 according to the calculation for focus adjustment. Accordingly, the person is focused corresponding to the mark 100 as displayed on the LCD unit 40.

Next, the focus control unit 80 determines whether the state of the release switch is at the second phase, at step S10. If the state of the release switchis at the second phase, then the picture is taken, at step S11. The picture is taken as follows. The focus control unit 80 compresses the image data stored in the frame memory unit 50. Next, the image signal processing unit 70 stores the compressed data in the flash memory card unit 60. Consequently, the data stored in the flash memory card unit 60 is photographic image data of the subject.

As described above, since a user can relocate a focus point to a desirable position of a subject, a user can take a picture having a certain position focused without changing the frame or composition of the picture.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for controlling a focus position, comprising:
   a display screen displaying an image corresponding to a subject and a mark representing the focus position on the image;
   a touch screen allowing a user to relocate the mark on the display screen;
   a first memory unit storing image data corresponding the entire image;
   a focus control unit generating an address of the image data stored in the first image storage corresponding to a coordinates of the relocated focus position, processing the image data to set the focus position on a position of the subject corresponding to the relocated mark, and compressing the image data having the focus position set on the relocated mark; and
   a second memory unit storing the compressed image data.

2. The apparatus of claim 1, wherein the focus control unit calculates the focus position by processing image data corresponding to the mark moved by the touch screen.

3. A digital still camera, comprising:
   a display unit showing an image corresponding to a subject and a mark representing a focus position on the image;
   a first image storage storing image data corresponding to the entire image;
   a touch screen allowing a user to relocate the mark on the display unit means;
   a focus control unit generating an address of the image data stored in the first image storage corresponding to a coordinates of the relocated focus position, processing the image data to set the focus position on a position of the subject corresponding to the relocated mark, and compressing the image data having the focus position set on the relocated mark; and
   a second image storage storing the compressed image data.

4. The digital sill camera of claim 3, wherein the display unit comprises a display screen showing the image and the mark.

5. The digital still camera of claim 3, wherein the touch screen is established on a camera body.

6. The digital still camera of claim 3, wherein the focus control unit calculates the focus position by processing image data corresponding to the mark moved by the touch screen.

7. The digital still camera of claim 6, wherein the focus control unit restores the compressed image data.

8. A method for operating a digital still camera, comprising the steps of:
   (a) displaying a subject and a focus mark on a display screen;
   (b) storing image data corresponding to the entire subject;
   (c) determining a position on the display screen to which an operator relocates the focus mark based on an operator's manipulation of a touch screen;
   (d) displaying the focus mark on the position to which the operator relocates the focus position;
   (e) focusing the camera corresponding to the relocated focus position, the step of focusing further comprising steps of:
      generating an address of a memory storing image data corresponding to a coordinates of the relocated focus position;
      reading the image data stored in the address; and
      calculating a focus position by processing the image data;
   (f) photographing the subject with the focus position at the relocated position of the focus mark and converting the photographed subjected into digital image data;
   (g) compressing the digital image data;
   (h) storing the compressed digital image data; and
   (i) restoring the compressed digital image data as needed.

* * * * *